Patented May 10, 1938

2,117,037

UNITED STATES PATENT OFFICE 2,117,037

PREPARATION OF CELLULOSE XANTHATE SOLUTION

George A. Richter, Berlin, N. H., assignor to Brown Company, Berlin, N. H., a corporation of Maine No Drawing. Application January 10, 1936, Serial No. 58,539

9 Claims. (Cl. 260—100)

This invention relates to a process of preparing cellulose xanthate solution or viscose syrup such as is satisfactory for conversion into artificial silk, films, or kindred ultimate products by the usual practices. It deals more especially with a process of preparing cellulose xanthate solution involving an admixture of the various raw materials chemically required for the preparation of such solution so that the finished solution can be realized from essentially only one continued mixing and reacting operation performed in a relatively short period of time in a single mixing and reacting vessel.

An object of the present invention is to enable the preparation of cellulose xanthate solution by such a one-step xanthating operation from cellulose fiber in an advantageous and economical physical form. Another object thereof is the realization of cellulose xanthate solution possessed not only of the appropriate composition, including cellulose and alkali concentration, for conversion into such ultimate products as artificial silk and films, but characterized by such desired and important qualities as substantial clarity and freedom even from gelled particles invisible to the naked eye and without noticeable effect on the clarity of solution.

In accordance with the present invention, sheets of suitable cellulose pulp, such as the sheets or boards of wood pulp heretofore used in viscose preparation, are initially reduced to small pieces or chips and the chips then placed in a mixing and reacting vessel adapted for the one-step xanthating operation. While not limited thereto, the mixing and reacting apparatus may advantageously be that disclosed in application Serial No. 53,689, filed December 10, 1935, by Orton B. Brown. Generally speaking, the apparatus of that patent application, which consists of jacketed intercommunicating mixing compartments arranged in tandem to afford an elongated reacting vessel, is designed to be revolved about an axis perpendicular to its long axis either simultaneously with the operation of the mixing blades in each compartment or independently thereof. To the vessel containing the pulp chips is added caustic soda solution preferably but not necessarily of mercerizing activity and the chips are allowed to soak in such solution until they have softened and swollen to such a degree that they may readily be defiberized into a fiber suspension or dispersion substantially devoid of fiber aggregates or clumps. It is preferable to revolve the vessel during the soaking period so as to ensure a substantially uniform impregnating, softening, and swelling action on the chips. Water is then added to the vessel to dilute the causticity and cellulose content of the mixture, for instance, in amount to effect dilution to that desired in the finished xanthate solution to be prepared therefrom, whereupon the mixers in the several compartments are set in operation and the vessel revolved until the chips have been completely defiberized and a thick fiber suspension substantially free of fiber aggregates is had. At this stage of the operation, liquid carbon bisulphide in amount calculated to effect the desired xanthating reaction is added to the vessel and the vessel revolved and its mixers operated until the desired substantially clear xanthate solution results. It is usually preferable to add diluting water to the ingredients prior to their xanthation in amount insufficient to produce a finished xanthate solution of the desired dilution, in which case the dilution of the xanthate solution to the desired endpoint is adjusted after xanthation is substantially complete.

The process of the present invention makes possible the use of wood pulp or equivalent cellulose fiber in the form of the relatively dense sheets or boards heretofore supplied to the viscose-making industry. It is economical to put up wood pulp in sheet form at a pulp mill; and such form of pulp may also be economically stored and shipped. The cost of cutting the sheets into small pieces or chips, for instance, into chips about one-half inch square, is low. Such chips are of a density such that they occupy a small volume per unit of weight, as compared to fluffed or shredded cellulose fiber. Thus, about 10 to 15 pounds of chips of about ½" square cut from the usual wood pulp sheets supplied to the viscose-making industry occupies only about 1 cubic foot. Indeed, the density or compactness of such chips is so great that considerable difficulty would be experienced if one had to rely merely upon mixing with water or dilute caustic soda solution to accomplish a substantially complete defiberization thereof. By preliminarily soaking and swelling the chips in strong caustic soda solution, however, not only is disintegration of the chips greatly facilitated so that a fiber suspension substantially devoid of fiber aggregates may be easily attained, but the dispersed or suspended fiber units are evidently activated for the xanthating reaction, insomuch that the xanthate solution prepared therefrom is substantially devoid of even microscopically fine undissolved or gelatinous particles. Again, by using the cellulose in the form of chips, it is possible to wet and soak the cellulose substantially uniformly and to activate it with a concentrated alkali solution in small volume calculated, upon mere dilution with water, to yield a finished xanthate solution of the desired causticity and cellulose concentration. It is thus possible to avoid the use of excess concentrated alkali solution such as would necessitate such extra steps as draining, squeezing, or centrifuging excess solution from the cellulose.

A specific procedure embodying the present invention may be performed so far as concerns proportionality of the various ingredients, including cellulose pulp, caustic soda, water, and carbon bisulphide, to accord with the disclosure of my patent application Serial No. 37,043 filed August 20, 1935. Preferably, but not necessarily, the cellulose pulp herein employed has the low solution viscosity of the pulp specified in that application. As already indicated, however, the pulp is used in sheet form and the sheets are cut into chips of say, about ½" square. After the chips have been added to the mixing and reacting vessel, a caustic soda solution of say, at least about 18% strength, is added to the chips in volume calculated to yield a finished cellulose xanthate solution of a cellulose and caustic soda content each falling within the range of 6% to 10%. The mixture of chips and solution is permitted to stand for about 20 minutes to 3 hours, during which period the chips become quite soft and swollen as a result of the soaking of the solution into and throughout the chips and the attendant mercerizing and swelling action on the fibers. The mixture may then be advantageously tumbled for a short while when the reacting vessel is of the type hereinbefore mentioned. The soaked chips may then be diluted with water in amount calculated to yield a mixture of the desired fluidity, for instance, one of 10% caustic soda content, based on the weight of the mixture, or to yield the desired finished xanthate solution, whereupon the mixing blades of the vessel may be put in motion and the mixture simultaneously tumbled until the chips have been resolved into the ultimate or individual fibers to yield a salve-like suspension substantially devoid of fiber aggregates. To this suspension is added liquid carbon bisulphide in the amount necessary for the xanthating reaction and the mixed ingredients subjected to the mixing and tumbling treatment conducive to the formation of the desired finished xanthate solution in a relatively short period of time. Once the xanthate solution has been prepared, it may be diluted to the desired end-point. Thus, it is usually preferable to xanthate the fiber while mixed with or suspended in caustic soda solution in such proportions that the mixture contains about 10% each of caustic soda and fiber, based on the entire mixture, and, after xanthation is completed, to adjust the dilution of the xanthate solution to the desired end-point, for instance, to add water in amount to dilute each the caustic soda and cellulose content to about 7 to 7.5%, based on the weight of the xanthate solution, which latter concentration is that usually desired in the spinning of artificial silk. It might be remarked that, excepting the use of the pulp in chip form and the preliminary soaking of the chips in caustic soda solution of preferably mercerizing activity, the process of the present invention may be carried out substantially in the same way as described in my application Serial No. 37,043.

In some instances, the preliminary soaking of the chips with caustic soda solution may take place at low temperatures, for instance, at about 0° C., as by circulating suitable refrigerant through the jacket of the mixing and reacting vessel. While such low temperature soaking may be effected with caustic soda solution of 15 to 18% or even greater strength to increase the mercerizing effect on the chips, yet the caustic soda solution might be considerably more dilute, for instance, be of such causticity as to require substantially no further dilution to yield a finished xanthate solution of a cellulose and caustic soda content each falling within the range of about 7 to 10%. Thus, soaking at temperatures of about 0° C. or lower means that the desired mercerizing activity on the chips can be realized with caustic soda solutions of 7 to 10% strength. Of course, once the desired softening, swelling, and mercerizing action has been effected on the chips, the mixture may be raised to about 15 to 20° C. preparatory to the defiberization of the chips. However, it is possible in accordance with the present invention to use caustic soda solutions of less than mercerizing causticity at ordinary temperatures, that is, of less than about 18% strength, and to carry out the soaking of the chips in such solutions at normal or non-mercerizing temperatures. Moreover, the preliminary soaking action may be effected on the chips at temperatures higher than 20° C., particularly when caustic soda solutions of greater than 18% strength are employed, although solutions of lower strength might also be employed in such case. Thus, more rapid penetration of the chips by the solution is had when the solution is at elevated temperature, say, 30° to 50° C.; and there is less tendency at such temperature for the chips to pulp up or release individual fibers or fiber fragments. An elevated temperature soaking of the chips also results in some lowering of the solution viscosity of the cellulose xanthate prepared from the chips so that the operator may, through control of the temperature of the soaking solution, produce a finished xanthate solution of particular viscosity within certain limits, should such control be desired. After the high temperature soaking, the soaked mass of chips is preferably cooled to 20° C., disintegrated or pulped up, and the resulting fiber suspension xanthated at such temperature or other suitable temperature, say, 15° C., or the disintegration of the soaked mass of chips may first be effected and the resulting fiber suspension cooled to 20° C. preparatory to xanthation at such temperature or other suitable temperature.

An important advantage of the present process is that it enables the use of all kinds of cellulose pulps as raw materials, including pulps derived from birch and other hardwoods. In the usual viscose-making process, the use of sulphite or other wood pulps derived from hardwoods generally leads to viscose syrup containing myriad fiber fragments or so-called tails, these representing cellulose residue that has escaped the xanthating action of the carbon bisulphide. Such viscose syrup cannot be filtered properly and is considered unsatisfactory for conversion into artificial silk or films. When hardwood pulps are used as raw material in the process of the present invention, not only is the viscose syrup without fiber fragments but it is substantially free from fine gelatinous particles. The process of the present invention lends itself nicely to application to various kinds of cellulose fiber, including sulphite and other chemical wood pulps derived from coniferous woods, such as spruce, chemical wood pulps refined to high alpha cellulose content, cotton, etc.

The initial step of soaking the pulp chips might, in accordance with the present invention, be done by placing them in wire cloth baskets and dipping the baskets into the caustic soda solution of mercerizing or non-mercerizing activity. Thus, a succession of baskets charged with the chips may be progressively run through the solution to effect a thorough soaking of the chips. Or the chips might be sprayed with the solution as they are being carried by a foraminous conveyor. Pulp chips treated in this manner might be permitted to remain soaked with the solution of mercerizing activity for a sufficiently long period of time to be conditioned for the subsequent treatments of the present invention. As previously indicated, however, it may be preferable to carry out the soaking in the same vessel in which xanthation of the pulp is to be effected and to use soaking solution in amount to avoid the need of draining, squeezing, centrifuging, or similar extra step. Aside from the extra equipment necessary when soaking of the chips is effected outside of the xanthating vessel, a basket-dipping of the chips into the soaking solution or the spraying of the chips with the solution does not readily lend itself to control of the amount of solution associated with the chips, in consequence of which it is necessary to associate excess solution with the chips and then to employ the additional step of draining, squeezing, or centrifuging and the equipment incidental thereto.

There are instances, however, when it may be advantageous to soak the chips in caustic soda solution containing caustic soda in amount in excess of that required for realizing from the mixture of chips and soaking solution a xanthate solution of particular desired cellulose and caustic soda content. Thus, it is possible in such instances to effect purification of the pulp chips upon removing therefrom, as by drainage, an amount of solution containing the excess caustic soda. In such instances, the chips may be soaked in a large excess of caustic soda solution of appropriate concentration and, after the chips have been substantially uniformly penetrated by the solution, they may be drained until they contain only the mount of caustic soda necessary for the preparation of a finished xanthate solution of the desired cellulose and caustic soda content. The amount of solution drained from the chips may be controlled by titrating the chips and/or solution squeezed from the chips and/or by measuring the volume of solution being drained from the chips as drainage proceeds so as to ensure in the drained chips the alkali content requisite for the xanthate solution to be prepared therefrom. It is found that the chips do not lose their physical form during soaking and drainage, wherefore they may be readily transferred, after drainage, to the xanthating vessel, assuming that preliminary soaking is performed in separate equipment. When the pulp subjected to such preliminary soaking contains non-alpha cellulose impurities capable of being acted upon and dissolved by the soaking solution, the excess solution removed from the chips contains part of the dissolved non-alpha cellulose impurities, in consequence of which the drained chips subjected to xanthation are of greater purity than the chips used as the starting material and hence yield xanthate solutions of improved quality. When working with excess soaking solution, it is possible to use for the purpose of the present invention caustic soda solution of less than mercerizing strength, so long as it contains a sufficient concentration of caustic soda to associate with the chips, after appropriate drainage, the amount of caustic soda necessary for the desired finished xanthate solution. Depending upon the strength of the solution used in the soaking step and/or upon the amount of soaking solution drained from the soaked chips and/or upon the composition of finished xanthate solution desired, diluting water may or may not be added during the disintegration of the soaked chips effected preparatory to xanthation. It might be noted that the use of pulp in chip form is of advantage even with solution of non-mercerizing strength or activity, as a mass of chips is readily and uniformly penetrated by such solution, and, after the soaking period, excess solution is readily drained therefrom by reason of the multitudinous comparatively large interstices afforded in the body of such a mass. On the other hand, pulp in fluffed or shredded form does not permit of these advantages or the advantage of easy transfer to a xanthating vessel without loss of fibers and fiber fragments. Moreover, pulp in chip form once having undergone preliminary soaking disintegrates readily in a xanthating vessel or mixer into the ultimate or individual fibers of which the chips are composed to yield a salve-like suspension substantially devoid of fiber aggregates and hence readily xanthatable into a finished xanthate solution of the desired quality. These results cannot be had through the processing of large sheets of pulp such as enter into the usual viscose-making process.

The sheets or pulpboard employed pursuant to the present invention may vary in its density or compactness. The pulpboard ordinarily used is produced from substantially unbeaten wood pulp and may have a compactness or density varying from about 50 to 120 and a thickness ranging from about .030 to .060 inch. However, it is possible to use sheets whose compactness and thickness are considerably greater or less than these values. The pieces or chips into which the sheets are cut may vary in size, but it is preferable that they have an area no greater than about one square inch. If desired, the sheets may contain residual moisture, particularly when moisture facilitates their cutting into chips.

The sheet compactness values herein given are obtained by dividing the basis weight of the sheet in pounds by its thickness in inches and multiplying by the factor $10^{-2}$. The basis weight values herein given signify the weight in pounds of 480 sheets whose dimensions are 24 x 36 inches, that is, the weight of 2880 square feet of the sheet material.

I claim:—

1. A process of preparing cellulose xanthate solution from sheets of cellulose fiber, which comprises cutting the sheets into chips consisting of fiber aggregates, soaking the chips with caustic soda solution of mercerizing activity to soften and swell them and to associate with the fiber the caustic soda desired in the finished xanthate solution, disintegrating the softened chips to form a fiber suspension in caustic soda solution substantially devoid of fiber aggregates, said last-named solution containing caustic soda solution furnished by the solution of mercerizing activity and being in amount and in concentration calculated to yield a finished xanthate solution of a cellulose and caustic soda content each falling within the range of 6% to 10%, and adding carbon bisulphide to said suspension and mixing the ingredients for a sufficient period of time to cause them to react substantially to completion to yield the desired cellulose xanthate solution.

2. A process of preparing cellulose xanthate solution from sheets of cellulose fiber, which comprises cutting the sheets into chips consisting of fiber aggregates, soaking the chips with caustic soda solution of at least about 18% strength to soften and swell them and to associate with the fiber caustic soda in amount desired in the finished xanthate solution, diluting the caustic soda solution associated with the fiber with water in amount calculated to yield a finished xanthate solution of a cellulose and caustic soda content each falling within the range of 6% to 10%, disintegrating the softened chips to form a fiber suspension in such diluted solution substantially devoid of fiber aggregates, and adding carbon bisulphide to said suspension and mixing the ingredients for a sufficient period of time to cause them to react substantially to completion to yield the desired cellulose xanthate solution.

3. A process of preparing cellulose xanthate solution, which comprises forming from substantially unbeaten wood pulp a pulpboard having a thickness of about 0.030 to 0.060 inch and a compactness of about 50 to 120, cutting the pulpboard into chips of an area not greater than about one square inch, soaking the chips with caustic soda solution of at least about 18% strength to soften and swell them and to associate with the fiber caustic soda in amount desired in the finished xanthate solution, diluting the caustic soda solution associated with the fiber with water in amount calculated to yield a finished xanthate solution of a cellulose and caustic soda content each falling within the range of 6% to 10%, disintegrating the softened chips to form a fiber suspension in such diluted solution substantially devoid of fiber aggregates, and adding carbon bisulphide to said suspension and mixing the ingredients for a sufficient period of time to cause them to react substantially to completion to yield the desired cellulose xanthate solution.

4. A process of preparing cellulose xanthate solution from sheets of cellulose fiber, which comprises cutting the sheets into chips consisting of fiber aggregates, soaking the chips with caustic soda solution to soften them, the amount and concentration of solution employed being such that its caustic soda content is in excess of that calculated to yield a finished xanthate solution of a cellulose and caustic soda content each falling within the range of 6% to 10%, removing from the soaked chips substantially only an amount of caustic soda solution containing such excess caustic soda, disintegrating the softened chips in the presence of the caustic soda solution retained thereby and added diluting water to form a fiber suspension in caustic soda solution substantially devoid of fiber aggregates and containing caustic soda in amount and in concentration calculated to yield a finished xanthate solution of a cellulose and caustic soda content each falling within the range of 6% to 10%, and adding carbon bisulphide to said suspension and mixing the ingredients for a sufficient period of time to cause them to react substantially to completion to yield the desired cellulose xanthate solution.

5. A process of preparing cellulose xanthate solution from sheets of cellulose fiber, which comprises cutting the sheets into chips consisting of fiber aggregates, soaking the chips with caustic soda solution of mercerizing activity to soften and swell them, the amount and concentration of soaking solution employed being such that its caustic soda content is in excess of that calculated to yield a finished xanthate solution of a cellulose and caustic soda content each falling within the range of 6% to 10%, removing from the soaked chips substantially only an amount of caustic soda solution containing such excess caustic soda, disintegrating the softened chips in the presence of the caustic soda solution retained thereby and added diluting water to form a fiber suspension in caustic soda solution substantially devoid of fiber aggregates and containing caustic soda in amount and in concentration calculated to yield a finished xanthate solution of a cellulose and caustic soda content each falling within the range of 6% to 10%, and adding carbon bisulphide to said suspension and mixing the ingredients for a sufficient period of time to cause them to react substantially to completion to yield the desired cellulose xanthate solution.

6. A process of preparing cellulose xanthate solution from sheets of cellulose fiber, which comprises cutting the sheets into chips consisting of fiber aggregates, soaking the chips with caustic soda solution of at least about 18% strength to soften and swell them, the amount of soaking solution employed being such that its caustic soda content is in excess of that calculated to yield a finished xanthate solution of a cellulose and caustic soda content each falling within the range of 6% to 10%, removing from the soaked chips substantially only an amount of solution containing said excess caustic soda, disintegrating the softened chips in the presence of the caustic soda solution retained thereby and added diluting water to form a fiber suspension in caustic soda solution substantially devoid of fiber aggregates and containing caustic soda in amount and in concentration calculated to yield a finished xanthate solution of a cellulose and caustic soda content each falling within the range of 6% to 10%, and adding carbon bisulphide to said suspension and mixing the ingredients for a sufficient period of time to cause them to react substantially to completion to yield the desired cellulose xanthate solution.

7. A process of preparing cellulose xanthate from sheets of cellulose fiber, which comprises cutting the sheets into chips consisting of fiber aggregates and having an area of about one-quarter to about one square inch, soaking the chips with caustic soda solution to soften them and to associate with the fiber sufficient caustic soda to permit its conversion into cellulose xanthate, disintegrating the softened chips to form a fiber suspension substantially devoid of fiber aggregates in caustic soda solution containing caustic soda furnished by said soaking solution, and adding carbon bisulphide to the suspension and mixing the ingredients to cause them to react to yield cellulose xanthate.

8. A process of preparing cellulose xanthate from sheets of cellulose fiber, which comprises cutting the sheets into chips consisting of fiber aggregates and having an area of about one-quarter to about one square inch, soaking the chips with caustic soda solution of mercerizing activity to soften and swell them and to associate with the fiber sufficient caustic soda to permit its conversion into cellulose xanthate, disintegrating the softened chips to form a fiber suspension substantially devoid of fiber aggregates in caustic soda solution containing caustic soda furnished by said soaking solution, and adding carbon bisulphide to said suspension and mixing the ingredients to cause them to react to yield cellulose xanthate.

9. A process of preparing cellulose xanthate from sheets of cellulose fiber, which comprises cutting the sheets into chips consisting of fiber aggregates and having an area of about one-quarter to about one square inch, soaking the chips with caustic soda solution of at least about 18% strength to soften and swell them and to associate with the fiber sufficient caustic soda to permit its conversion into cellulose xanthate, disintegrating the softened chips to form a fiber suspension substantially devoid of fiber aggregates in caustic soda solution containing caustic soda furnished by said soaking solution, and adding carbon bisulphide to said suspension and mixing the ingredients to cause them to react to yield cellulose xanthate.

GEORGE A. RICHTER.